(12) United States Patent
Kushner

(10) Patent No.: US 7,370,754 B2
(45) Date of Patent: May 13, 2008

(54) LENS CLEANING KIT

(76) Inventor: Robert Gerald Kushner, Flat G, Block G, Merry Terrace, 4 Seymour Road, Mid-Levels (HK)

( * ) Notice: Subject to any disclaimer, the term of this patent is extended or adjusted under 35 U.S.C. 154(b) by 664 days.

(21) Appl. No.: 10/871,972

(22) Filed: Jun. 18, 2004

(65) Prior Publication Data

US 2005/0279652 A1 Dec. 22, 2005

(51) Int. Cl.
*A45C 11/00* (2006.01)

(52) U.S. Cl. ............................ 206/38; 206/233
(58) Field of Classification Search ............. 206/233, 206/223, 38, 581, 5; 220/4.21, 4.27, 522, 220/521, 345.1, 4.24, 4.25, 345.2, 345.5, 220/345.4

See application file for complete search history.

(56) References Cited

U.S. PATENT DOCUMENTS

| 2,012,033 | A | * | 8/1935 | Atwater et al. ............. 206/267 |
| 2,775,344 | A | * | 12/1956 | Benedikz ..................... 239/289 |
| 4,389,132 | A | | 6/1983 | Valadez |
| 4,454,966 | A | * | 6/1984 | Hicks ..................... 222/153.11 |
| 4,796,751 | A | | 1/1989 | Madkour |
| 4,818,134 | A | | 4/1989 | Tsai |
| 5,083,661 | A | | 1/1992 | Burwell |
| 5,439,104 | A | | 8/1995 | Wolska-Klis |
| 6,145,655 | A | * | 11/2000 | Tsai ............................ 206/38 |
| 6,170,651 | B1 | * | 1/2001 | Taormina ...................... 206/5 |
| 6,439,379 | B2 | * | 8/2002 | Taormina ...................... 206/5 |
| 6,726,016 | B2 | * | 4/2004 | Chen .......................... 206/581 |
| 6,883,989 | B2 | * | 4/2005 | Kushner et al. ............ 401/125 |
| 2003/0143016 | A1 | | 7/2003 | Kushner et al. |

* cited by examiner

*Primary Examiner*—Mickey Yu
*Assistant Examiner*—Jerrold Johnson
(74) *Attorney, Agent, or Firm*—Stuart Whittington, Esq.

(57) ABSTRACT

A portable cleaning system including a casing for storing a cleaning agent in one compartment and a towel in a second compartment. The compartments may be slidably connected to have an open position and a closed position.

10 Claims, 5 Drawing Sheets

LENS CLEANING KIT

BACKGROUND OF THE INVENTION

1. Technical Field

The present invention pertains to a device for cleaning objects such as eyeglasses, sunglasses, lenses, golf balls, mirrors and other items. More specifically, but not exclusively, the invention relates to convenient portable casing for stowing a cleaning solution and a drying towel.

2. Background Art

It is frequently necessary to remove dirt, films, moisture and other soiling materials from objects in one's possession. Often, such soiling materials need to be removed while in transit or away from where conventional cleaning materials may be stored. Previous attempts have been made to provide integrated cleaning systems that are convenient for a user, and some that are portable. Examples of the previous attempts follow.

U.S. Pat. No. 5,439,104 to Wolska-Klis discloses an eyeglass cleaning station including a compartmented housing containing a dispensing bottle of liquid lens cleaning material and a dispensing box of disposable lens cleaning tissue. The eyeglass-cleaning compartment may be placed on a countertop.

U.S. Pat. No. 5,083,661 to Burwell discloses a lens or eyeglass cleaning device having an elongated storage container and a cleaning cloth attached to the container with a retaining cord in a manner that the cloth may be retracted into the container by pulling on an end of the retaining cord opposite the cloth.

U.S. Pat. No. 4,796,751 to Madkour discloses a portable kit for cleaning eyeglass lenses which includes a flat, flexible container having two separately openable compartments, one of the compartments contains a liquid eyeglass lens cleaner absorbed on an absorbent material and the second compartment contains a dry wiping material which may be removed to wipe lens cleaner from a lens.

U.S. Pat. No. 4,389,132 to Valadez and U.S. Pat. No. 4,818,134 to Tsai disclose respective pens for cleaning eyeglasses. The Valadez eyeglass cleaning pen includes felt tip for applying cleaning solution in a first container to a desired surface and a second container serving as a cap and dispenser for a wiping material. The Tsai eyeglass-cleaning pen consists of a similar felt tip pen having at least one spectacle screwdriver removably mounted on the pen body.

The foregoing attempts, and other conventional systems, each have certain drawbacks including; for example, certain of the above-described systems: (i) are not conveniently suitable for portable situations (e.g., the Wolska-Klis eyeglass station); (ii) do not include any cleaning solution whatsoever (e.g. the Burwell device for cleaning eyeglasses) and rely solely on a cleaning cloth for removal of soils (referred to as "dry systems"); and/or (iii) utilize small amounts of cleaning solution, such as the type applied by a felt tip (e.g., Valadez and Tsai pens)(referred to as "semi-dry systems").

Dry systems and semi-dry systems may work in some cases where the soiling material present on the surface to be cleaned is minute and/or has not significantly hardened. However dry and semi-dry systems may damage plastic lenses or UV/polarized coated lenses and can often lead to smearing of the soiling material, as opposed to removal, when a cleaning cloth is applied to a surface dry/semi-dry surface.

Additionally, certain of the conventional systems are complicated, not convenient to use and are suitable only for cleaning eyeglass/sunglass lenses (e.g., the Madkour portable kit for cleaning eyeglass lenses.)

Pending U.S. application Ser. No. 10/353,700, entitled "Portable Cleaning Device," filed on Jan. 29, 2003 by Kushner et al., and incorporated herein by reference, address some of the foregoing issues by disclosing a liquid spray cleaning kit with a retractable drying cloth.

However, additional integrated cleaning systems are desired that are relatively simple, compact, portable, convenient to use, and effective at removing even stubborn soil and from all types of surfaces.

BRIEF DESCRIPTION OF THE SEVERAL VIEWS OF THE DRAWING

Aspects, features and advantages of the present invention will become apparent from the following description of the invention in reference to the appended drawing in which like numerals denote like elements and in which.

DETAILED DESCRIPTION OF THE INVENTION

Figure 2:
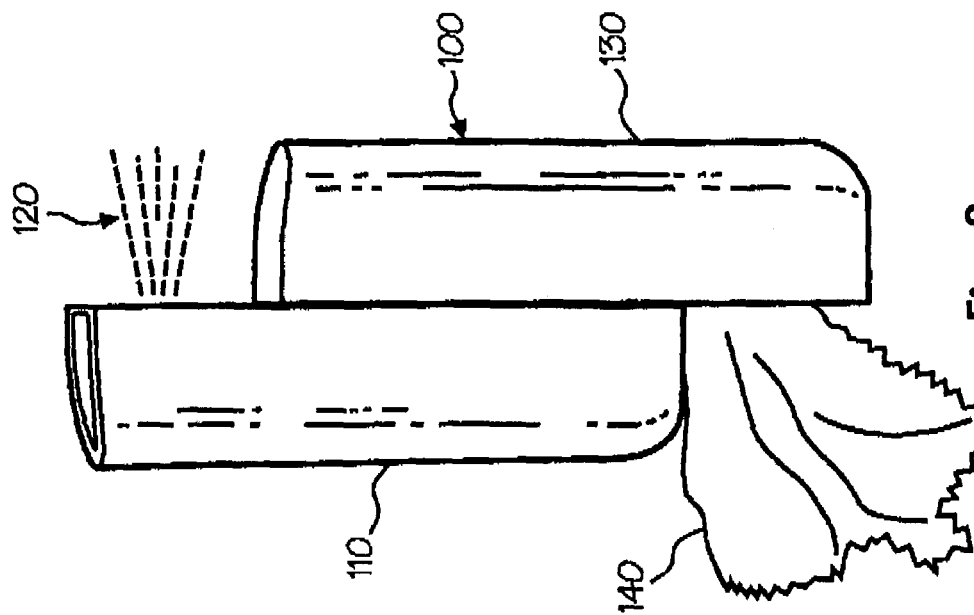
FIG. 2 is a front view of a portable cleaning device in an open position according to one embodiment of the present invention.
Figure 1:
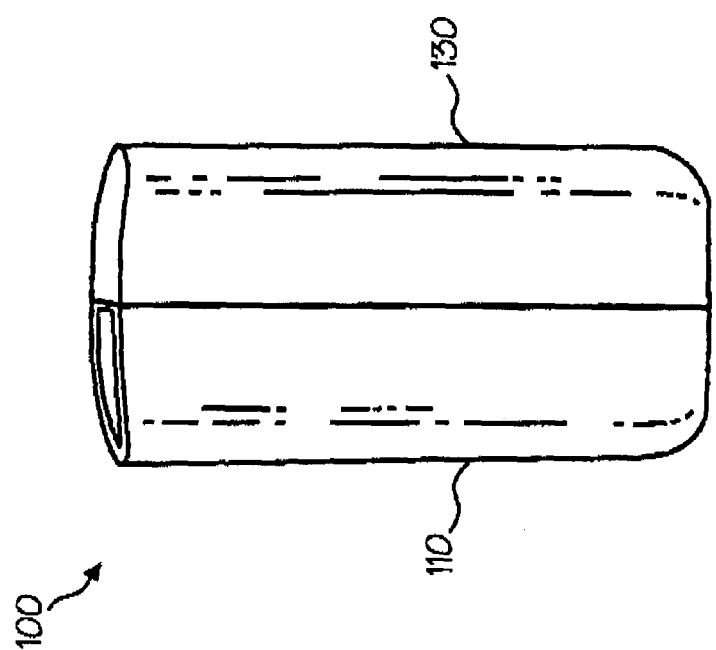
FIG. 1 is a front view of a portable cleaning device in a stowed position according to one embodiment of the present invention.

Referring to FIGS. 1-2, a portable cleaning device 100 according to one aspect of the invention generally includes a first housing member 110 adapted to store a cleaning solution 120 and a second housing member 130 adapted to store a towel 140.

Generally, the first and second housing members 110, 130 are movable between a first position and a second position such that, in the first position, the cleaning solution 120 and the towel 140 are enclosed within the portable cleaning device 100 (e.g., FIG. 1), and in the second position the cleaning solution 120 and the towel 140 are accessible (e.g., FIG. 2).

In an exemplary embodiment, the first and second housing members 110, 130 are adjacent one another and are configured to slide between the first and second positions as shown in FIGS. 1 and 2. Housing members 110, 130 may be made from any suitable material such as an injection molded ABS plastic and formed in any desired shape to accommodate cleaning solution 120 and towel 140.

Figure 4:
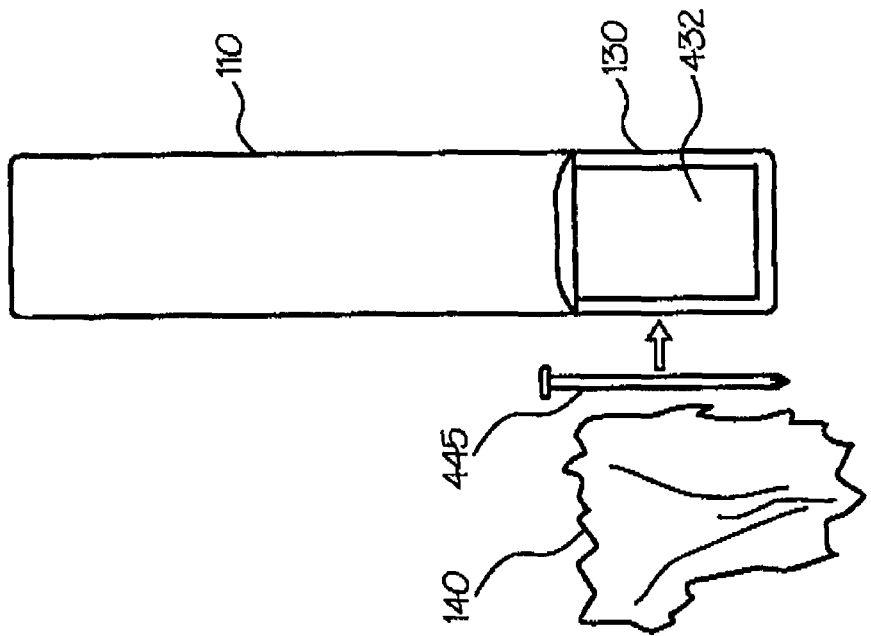
FIGS. 3 and 4 are respective a side views of the portable cleaning device of FIG. 2.
Figure 3:
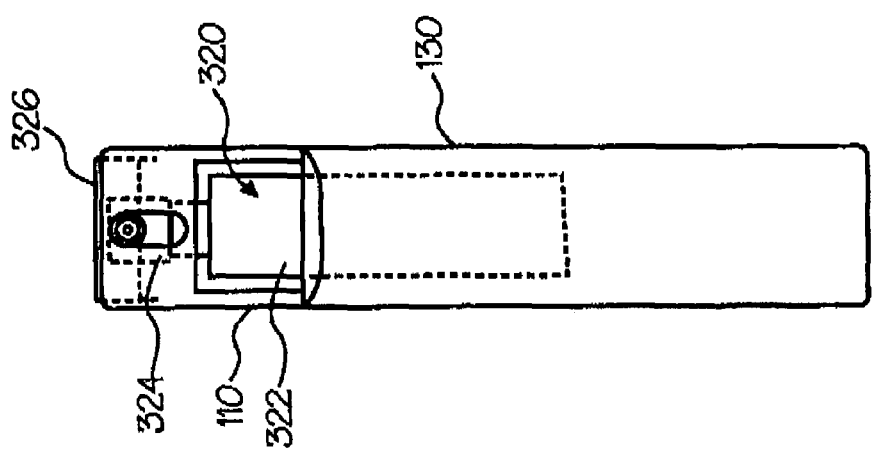

Turning to the side views of FIGS. 3-4, in certain implementations, cleaning solution 120 may be stored in a dispenser 320 although the inventive embodiments are not limited in this respect. Dispenser 320 may include a solution reservoir 322 and a pumping unit 324. Housing member 110 is preferably shaped to retain dispenser 320 inside. An actuator member 326 may be included, if desired, on an end of housing member 110 to enable a user to dispense cleaning solution from reservoir 322, e.g., via pumping unit 324, without removing dispenser 320 from housing member 110.

In alternate embodiments, housing member 110 may include an integrated reservoir and/or pump, or cleaning solution 120 may be dispensed via a dropper or other applicator (not shown). In other embodiments, housing member 110 may be adapted to accommodate a commercially available lens cleaning solution dispensers such as Natural Eyes and Shinize brand cleaners available from Quality Accessories, Inc., SEE SPRAY® brand cleaner available from QUIXTAR, Ultra Clarity brand lens cleaner available from Nanofilm, and the like.

Housing member 130 preferably includes one or more cavities 432 dimensioned and/or shaped to accommodate towel 140 and/or, if desired a tool such as screwdriver 445. Towel 140 may be any absorbent cloth or paper product suitable for removing applied cleaning solution 120 from a surface. In an exemplary embodiment, towel 140 is a microfiber cloth which may be used for cleaning eyeglass lenses although the embodiments are not limited in this respect. In other embodiments, towel 140 may be one or more disposable tissues or lens cleaning cloths and if desired, housing member 130 may be adapted to retain a disposable towel dispensing mechanism (not shown).

Figure 5:
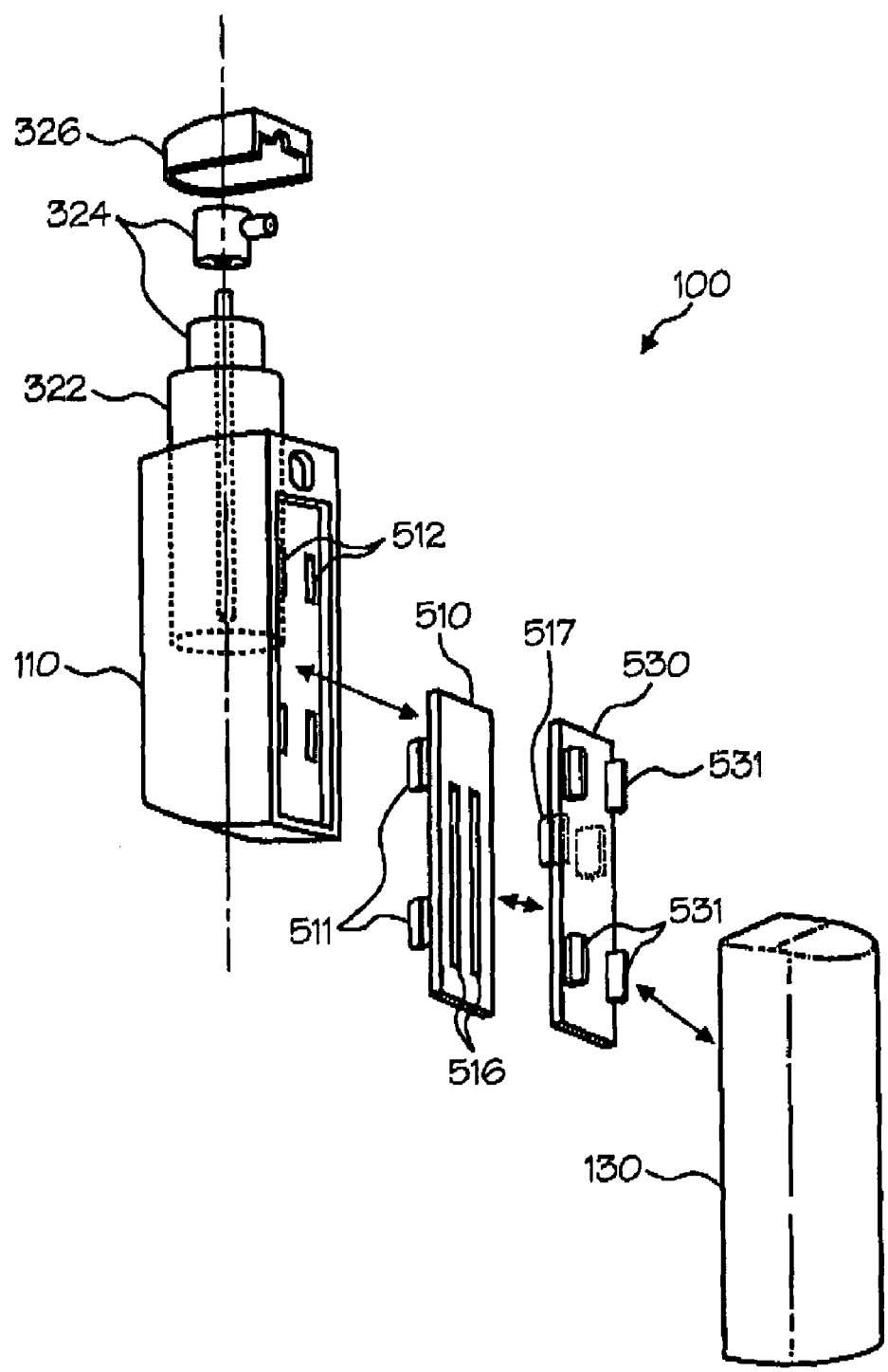
FIG. 5 is an exploded view of the portable cleaning device of FIGS. 2-4.

Turning to FIG. 5, a more detailed illustration shows an expanded view of an example portable cleaning device 100. Device 100 in this embodiment may include one or more slide members 510, 530 which attach to the respective housing members 110, 130 and facilitate sliding between first and second positions. Slide members 510, 530 may include one or more tabs 511, 531 which facilitate attachment to corresponding recesses 512 of housing members 110, 130. Slide members 510, 530 may further include one or more slots 516 and corresponding sliding tabs 517 to facilitate the sliding movement between housing members 110, 130. It should be recognized that tabs 511, 531 and recesses 512 on respective housing members 110, 130 and slide members 510, 530 could be reversed and/or alternate sliding configurations could be used in place of sliding members 510, 530. Accordingly, the inventive embodiments are not limited to any specific sliding arrangement.

Figure 6:
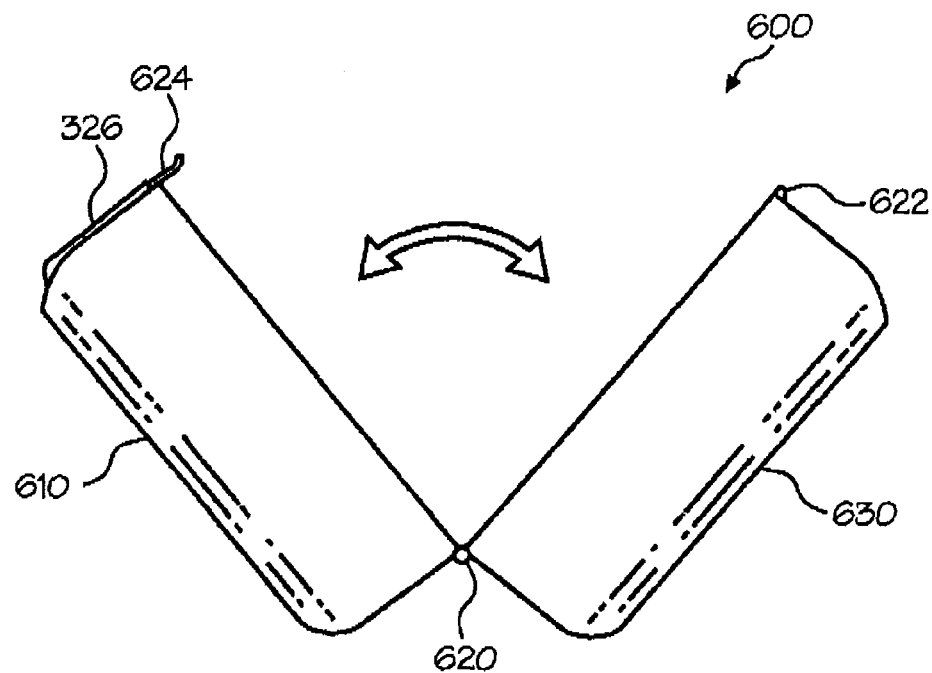
FIG. 6 is a front view of a portable cleaning device according to a second embodiment of the present invention.

Turning to FIG. 6, an alternate embodiment for a portable cleaning device 600 is shown. Device 600 includes two housing members 610, 630 which are similar to those described previously with respect to FIGS. 1-5. However, rather than sliding between open and closed positions, housing members 610, 630 pivot between open and closed positions. To this end, device 600 may include one or more hinges 620 and if desired, one or more locking mechanisms such as clasp 624 and corresponding protrusion 622. Housing member 610 is preferably adapted to enclose a spray dispenser and may include an actuator member 326 as previously described.

Figure 7:
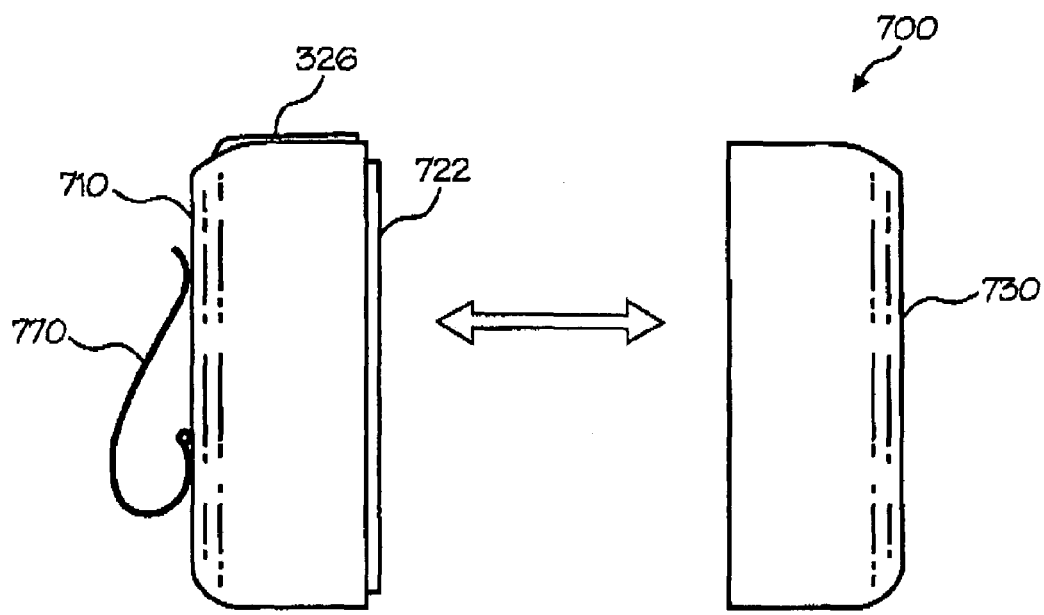
FIG. 7 is a front view of a portable cleaning device according to a third embodiment of the present invention.

Referring to FIG. 7, yet another embodiment for a portable cleaning device 700 includes two housing members 710, 730 respectively adapted to retain a cleaning solution and towel as with previous embodiments. However, in this embodiment, housing members 710 and 730 may completely detach from one another as shown by the arrow in FIG. 7, although it is possible that both members 710, 730 could be loosely connected via a chain or string (not shown) if desired. Housing member 710 may be similar to those previously described and may include one or more protruding edges 722 for mating with corresponding recesses of housing member 730 in a manner that a certain amount of pressure must be exerted on the housing members to attach or separate them from on another. Various other configurations could also be used for removably attaching housing members 710, 730 to each other. Housing member 710 may also contain an actuator member 326 for dispensing cleaning solution if suitably desired.

As with any of the embodiments disclosed herein, portable cleaning device 700 may include an attachment member 770 disposed on an outer surface thereof. Attachment member 770 may be any component or combination of components capable of retaining device 700 to a desired surface. For example, attachment member 770 could be a wire clip, magnet, double-sided tape, chain, rope, hook or other related components.

Figure 8:
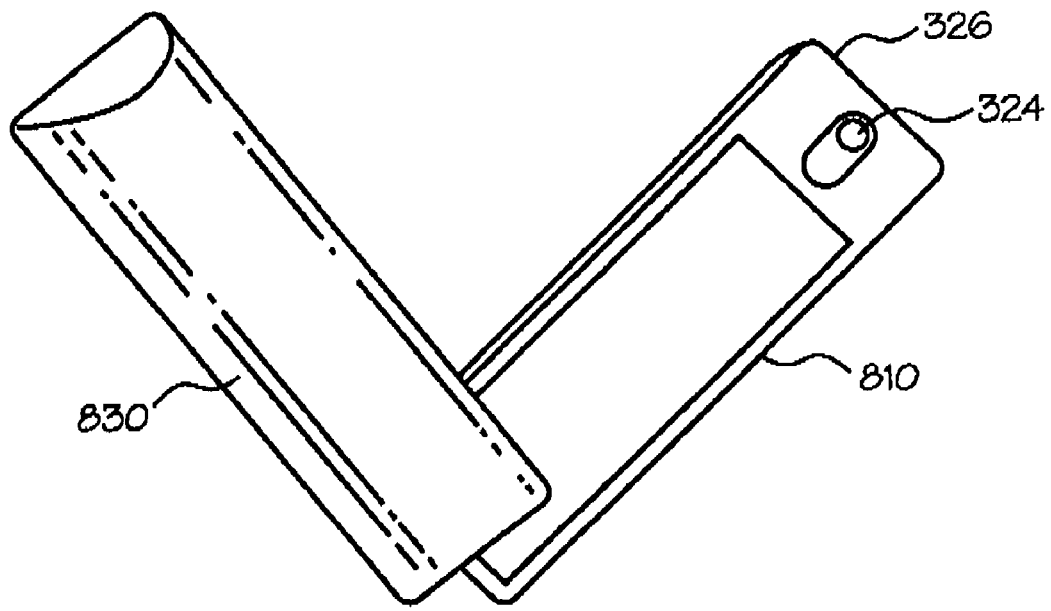
FIGS. 8 and 9 are views of portable cleaning devices according to various other embodiments of the present invention.

Referring to FIG. 8, a lens cleaning kit 800 according to yet another embodiment includes first and second housing members 810, 830, similar to those previously discussed, pivotally attached at respective ends. In this embodiment, members 810, 830 may be configured to pivot about a longitudinal axis of kit 800. To this end, kit 800 may include a pivot member (not shown) seated in an open side of each member 810, 830.

Figure 9:
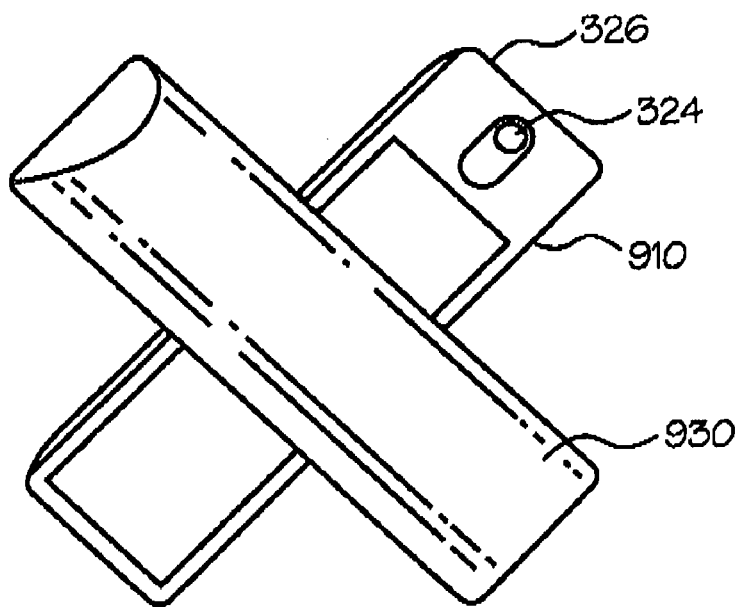

Similarly, referring to the lens cleaning kit 900 of FIG. 9, housing members 910, 930 may be pivotally connected in a middle area to rotate about a longitudinal axis.

The precise shape, materials, features and layout of any of the foregoing cleaning devices is discretionary and can be selected as suitably desired without departing from the scope of the invention. Further, the embodiments of the invention are not limited to the specific configurations described above.

Unless contrary to physical possibility, the inventor envisions the components of respective embodiments may be combined in any manner. Although there have been described preferred embodiments of this novel invention, many variations and modifications are possible and the embodiments described herein are not limited by the specific disclosure above, but rather should be limited only by the scope of the appended claims and their legal equivalents.

The invention claimed is:

1. A lens cleaning kit comprising:
    a housing comprising first and second members;
    a cleaning solution dispenser stowed in the first member; and
    a drying member stowed in the second member;
    wherein: the first and second members are permanently and slidably connected to have a closed position, in which the cleaning solution dispenser and the drying member are enclosed and inaccessible within the housing, and an open position in which solution may be applied from the cleaning solution dispenser to a desired surface and the drying member may be accessed, and the first and second members are permanently and slidably connected for reciprocating translational movement.

2. The lens cleaning kit of claim 1 wherein the drying member comprises a towel.

3. The lens cleaning kit of claim 2 wherein the towel comprises a microfiber cloth.

4. The lens cleaning kit of claim 1 wherein the dying member comprises a plurality of disposable lens cleaning tissues.

5. The lens cleaning kit of claim 1 further comprising a screwdriver stowed in the second member.

6. The lens cleaning kit of claim 1 wherein the cleaning solution dispenser comprises a spray bottle and wherein an end of the first member includes a movable member which, when depressed, may cause the spray bottle to discharge stored cleaning solution.

7. The portable cleaning device of claim 1 further comprising an attachment means connected to one of the first or second members for attaching the lens cleaning kit to a desired location.

8. The lens cleaning kit of claim 1 wherein the first member includes an end adapted to enable a user to apply cleaning solution from the cleaning solution dispenser to a desired surface without removing the cleaning solution dispenser from the first member.

9. The lens cleaning kit of claim 1 wherein the housing is formed from an injection molded plastic.

10. The lens cleaning kit of claim 1 wherein the cleaning solution dispenser Comprises a solution reservoir and a pumping unit.

* * * * *